(12) United States Patent
Rouse, Jr.

(10) Patent No.: US 12,214,276 B2
(45) Date of Patent: Feb. 4, 2025

(54) SYSTEM AND METHOD TO PROVIDE AN AUGMENTED REALITY GAME

(71) Applicant: Richard Lamar Rouse, Jr., Pittsburgh, PA (US)

(72) Inventor: Richard Lamar Rouse, Jr., Pittsburgh, PA (US)

( * ) Notice: Subject to any disclaimer, the term of this patent is extended or adjusted under 35 U.S.C. 154(b) by 50 days.

(21) Appl. No.: 18/103,468

(22) Filed: Jan. 30, 2023

(65) Prior Publication Data

US 2023/0249061 A1 Aug. 10, 2023

Related U.S. Application Data

(60) Provisional application No. 63/307,165, filed on Feb. 7, 2022.

(51) Int. Cl.
*G07F 17/32* (2006.01)
*A63F 13/2145* (2014.01)
*A63F 13/25* (2014.01)

(52) U.S. Cl.
CPC .......... *A63F 13/25* (2014.09); *A63F 13/2145* (2014.09); *A63F 2300/1075* (2013.01); *A63F 2300/8082* (2013.01)

(58) Field of Classification Search
None
See application file for complete search history.

(56) References Cited

U.S. PATENT DOCUMENTS

| | | | |
|---|---|---|---|
| 9,196,005 B2 * | 11/2015 | Williams | G06Q 30/0643 |
| 9,269,217 B2 * | 2/2016 | Hamlin | G07F 17/3211 |
| 10,593,146 B2 * | 3/2020 | Danielson | G06F 1/1686 |
| 2012/0184352 A1 * | 7/2012 | Detlefsen | G07F 17/3225 |
| | | | 463/25 |
| 2019/0051103 A1 * | 2/2019 | Russ | G07F 17/3213 |
| 2020/0114263 A1 * | 4/2020 | Vange | G07F 17/3225 |
| 2021/0322877 A1 * | 10/2021 | Chong | G06V 20/64 |
| 2022/0406004 A1 * | 12/2022 | Tian | G06T 7/75 |

* cited by examiner

*Primary Examiner* — Sunit Pandya

(57) ABSTRACT

A method and a system for providing an augmented reality (AR). The method includes identifying a horizontal surface to place an augmented reality arcade machine upon receiving a press gesture on a start button of an application displayed over a display screen of a computing device. The method includes placing the augmented reality arcade machine on a grid. The method includes transmitting a "gameStart" command to an application server upon receiving the press gesture on the play button. The application server utilizes a game token to load prize items into the slots. The method includes facilitating the user to use at least two controls to decide where the user wants to place the key. The method includes transmitting a command to the display screen to display one or more of a win user interface, and a lost user interface based on the computation performed by the application server.

8 Claims, 12 Drawing Sheets

SYSTEM AND METHOD TO PROVIDE AN AUGMENTED REALITY GAME

TECHNICAL FIELD

The presently disclosed embodiments are related, in general, to augmented reality. More particularly, the presently disclosed embodiments are related to a system and method to provide an augmented reality (AR) game over a communication network.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

Typically, augmented reality (AR) is a reality-based interface. AR interfaces supplement the real world with virtual (computer-generated) objects that appear to coexist in the same space as the real world. Currently, the users or players have to physically visit shopping malls or shops to play the game. The COVID-19 pandemic is not over, and outside recreational activities continue to be risky and complicated in many parts of the world. Accordingly, there is a need for a system and method to provide an augmented reality game that uses a mobile application.

Thus, in view of the above, there is a long-felt need in the gaming industry to address the aforementioned deficiencies and inadequacies.

Further limitations and disadvantages of conventional approaches will become apparent to one of skill in the art, through the comparison of described systems with some aspects of the present disclosure, as set forth in the remainder of the present application and with reference to the drawings.

SUMMARY

According to embodiments illustrated herein, there may be provided a method for providing augmented reality (AR). The method may be implemented by an application server including one or more processors. method and a system for. The method includes identifying a horizontal surface to place an augmented reality arcade machine upon receiving a press gesture on a start button of an application displayed over a display screen of a computing device. The method includes placing the augmented reality arcade machine on a grid. The display screen presents a play button and a reset button on the application after the placement of the augmented reality arcade machine on the grid. The method includes transmitting a "gameStart" command to an application server upon receiving the press gesture on the play button. The application server utilizes a game token to load a plurality of prize items into a plurality of slots. The slots include a total of nine slots, having three slots on each row available to a user, and the user places a key in one of the nine slots to win the prize item. The method includes facilitating the user to use at least two controls to decide where the user wants to place the key. The processor is configured to determine a probability of winning based on whether the key is placed in the slot or the key is out of the slot. The application server utilizes a threshold algorithm to compute whether the user has won or lost upon receiving a command pertaining to the probability of winning of the user from the processor. The method includes transmitting a command to the display screen to display one or more of a win user interface, and a lost user interface based on the computation performed by the application server.

According to embodiments illustrated herein, there may be provided a gaming system that includes at least one processor, at least one memory, a computing device, and an application server. The processor is configured to identify a horizontal surface to place an augmented reality arcade machine upon receiving a press gesture on a start button of an application displayed over a display screen of a computing device. The processor is configured to place the augmented reality arcade machine on a grid, wherein the display screen presents a play button and a reset button on the application after the placement of the augmented reality arcade machine on the grid. The processor is configured to transmit a "gameStart" command to the application server upon receiving the press gesture on the play button. The application server utilizes a game token to load a plurality of prize items into a plurality of slots. The plurality of slots include a total of nine slots, having 3 slots on each row available to a user, and the user places a key in one of the nine slots to win the prize item. The processor is configured to facilitate the user to use at least two controls to decide where the user wants to place the key. The processor is configured to determine a probability of winning based on whether the key is placed in the slot or the key is out of the slot. The application server utilizes a threshold algorithm to compute whether the user has won or lost upon receiving a command pertaining to the probability of winning of the user from the processor. The processor is configured to transmit a command to the display screen to display one or more of a win user interface, and a lost user interface based on the computation performed by the application server.

Accordingly, one advantage of the present invention is that it provides a system and method to provide an augmented reality game that uses a mobile application. By using the mobile application of the present invention, anybody who has an augmented reality-supported device can play the game at home or anywhere. The user does not need to travel to a particular shop or mall to play the Game. So, by using the mobile application, the user will get the same feeling of physical gaming at home.

These and other features and advantages of the present disclosure may be appreciated from a review of the following detailed description of the present disclosure, along with the accompanying figures in which reference numerals refer to like parts throughout.

BRIEF DESCRIPTION OF DRAWINGS

The accompanying drawings illustrate the various embodiments of systems, methods, and other aspects of the disclosure. Any person with ordinary skills in the art will appreciate that the illustrated element boundaries (e.g., boxes, groups of boxes, or other shapes) in the figures represent one example of the boundaries. In some examples, one element may be designed as multiple elements, or multiple elements may be designed as one element. In some examples, an element shown as an internal component of one element may be implemented as an external component in another and vice versa. Further, the elements may not be drawn to scale.

Various embodiments will hereinafter be described in accordance with the appended drawings, which are provided to illustrate and not to limit the scope in any manner, wherein similar designations denote similar elements, and in which.

DETAILED DESCRIPTION

The present disclosure may be best understood with reference to the detailed figures and description set forth herein. Various embodiments are discussed below with reference to the figures. However, those skilled in the art will readily appreciate that the detailed descriptions given herein with respect to the figures are simply for explanatory purposes as the methods and systems may extend beyond the described embodiments. For example, the teachings presented and the needs of a particular application may yield multiple alternative and suitable approaches to implement the functionality of any detail described herein. Therefore, any approach may extend beyond the particular implementation choices in the following embodiments described and shown.

References to "one embodiment," "at least one embodiment," "an embodiment," "one example," "an example," "for example," and so on indicate that the embodiment(s) or example(s) may include a particular feature, structure, characteristic, property, element, or limitation but that not every embodiment or example necessarily includes that particular feature, structure, characteristic, property, element, or limitation. Further, repeated use of the phrase "in an embodiment" does not necessarily refer to the same embodiment.

Figure 1:
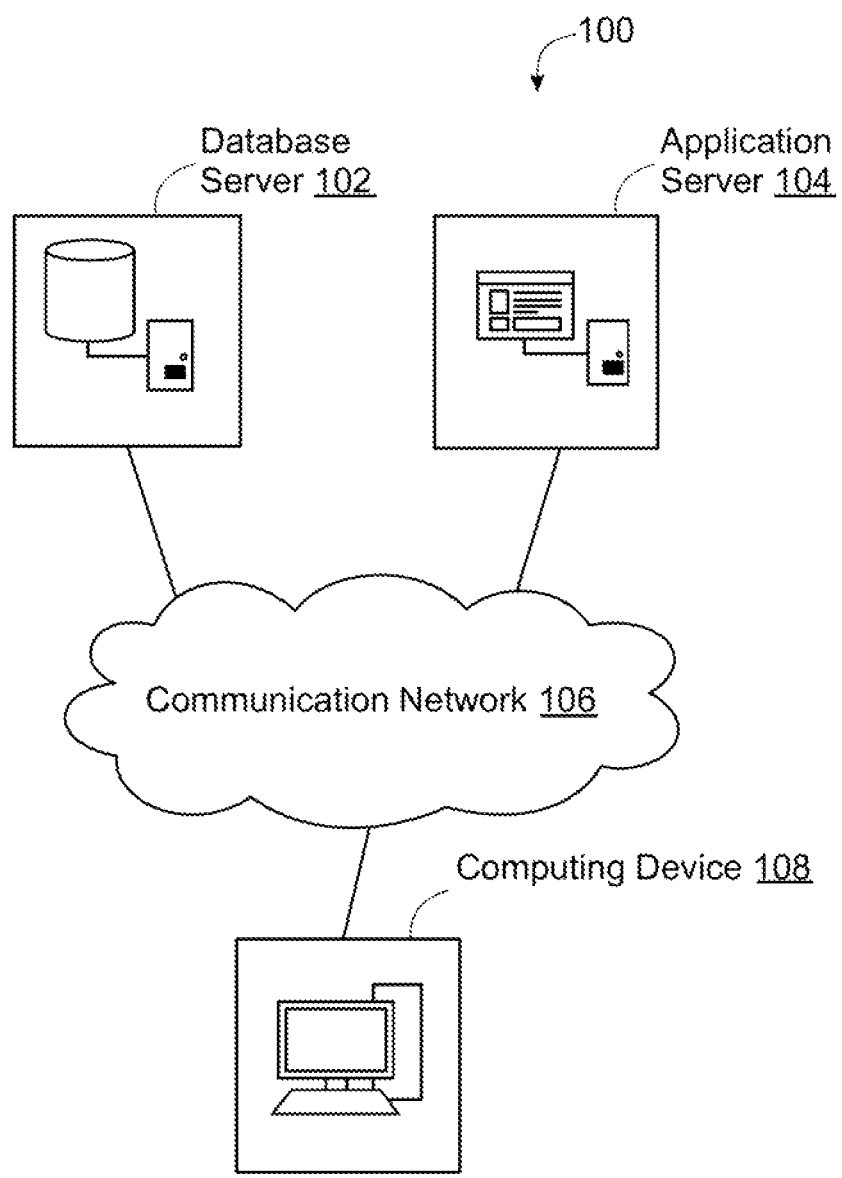
FIG. 1 is a block diagram that illustrates a system environment in which various embodiments of the method and the system may be implemented.

FIG. 1 is a block diagram that illustrates a system environment 100 in which various embodiments of the method and the system may be implemented.

The system environment 100 may include a database server 102, an application server 104, a communication network 106, and one or more computing devices 108a, 108b, . . . , 108n collectively referred to with the numeral 108 that may be associated with one or more users (not shown). The database server 102, the application server 104, and the one or more computing devices 108 may be communicatively coupled with each other via the communication network 106. In an embodiment, the application server 104 may communicate with the database server 102 using one or more protocols such as, but not limited to, Open Database Connectivity (ODBC) protocol and Java Database Connectivity (JDBC) protocol. In an embodiment, one or more mobile devices 108 may communicate with the application server 104, via the communication network 106.

In an embodiment, the database server 102 may refer to a computing device that may be configured to store the content related to augmented reality games that may be showcased at one or more locations. In an embodiment, the database server 102 may include a special-purpose operating system specifically configured to perform one or more database operations on the content related to the augmented reality game. Examples of database operations may include, but are not limited to, Select, Insert, Update, and Delete. In an embodiment, the database server 102 may include hardware that may be configured to perform one or more predetermined operations. In an embodiment, the database server 102 may be realized through various technologies such as, but not limited to, Microsoft® SQL Server, Oracle®, IBM DB2®, Microsoft Access®, PostgreSQL®, MySQL® and SQLite®, and the like.

In an embodiment, the database server 102 may be configured to utilize the application server 104 to provide an augmented reality game. The database server 102 may be configured to transmit the content related to the augmented reality game to the application server 104 for data processing, via the communication network 106. In an embodiment, the database server 102 may be configured to transmit the content related to the augmented reality game to one or more devices at one or more locations for showcasing the content related to augmented reality game.

A person with ordinary skills in the art will understand that the scope of the disclosure is not limited to the database server 102 as a separate entity. In an embodiment, the functionalities of the database server 102 can be integrated into the application server 104.

In an embodiment, the application server 104 may refer to a computing device or a software framework hosting an application or a software service. In an embodiment, the application server 104 may be implemented to execute procedures such as, but not limited to, programs, routines, or scripts stored in one or more memories for supporting the hosted application or the software service. In an embodiment, the hosted application or the software service may be configured to perform one or more predetermined operations. The application server 104 may be realized through various types of application servers such as, but are not limited to, a Java application server, a .NET framework application server, a Base4 application server, a PHP framework application server, or any other application server framework.

A person having ordinary skill in the art will appreciate that the scope of the disclosure is not limited to realizing the application server 104 and the one or more computing devices 108 as separate entities. In an embodiment, the application server 104 may be realized as an application program installed on and/or running on one or more computing devices 108 without departing from the scope of the disclosure.

In an embodiment, the communication network 106 may correspond to a communication medium through which the database server 102, the application server 104, and the one or more mobile devices 108 may communicate with each other. Such communication may be performed, in accordance with various wired and wireless communication protocols. Examples of such wired and wireless communication protocols include, but are not limited to, Transmission Control Protocol and Internet Protocol (TCP/IP), User Datagram Protocol (UDP), Hypertext Transfer Protocol (HTTP), File Transfer Protocol (FTP), ZigBee, EDGE, infrared (IR), IEEE 802.11, 802.16, 2G, 3G, 4G cellular communication protocols, and/or Bluetooth (BT) communication protocols. The communication network 106 may include but is not limited to, the Internet, a cloud network, a Wireless Fidelity (Wi-Fi) network, a Wireless Local Area Network (WLAN), a Local Area Network (LAN), a telephone line (POTS), and/or a Metropolitan Area Network (MAN).

In an embodiment, the one or more computing devices 108 may refer to a mobile device used by one or more users. The one or more computing devices 108 may comprise one or more processors 202 (shown in FIG. 2) and one or more memories 204 (shown in FIG. 2). The one or more memories 204 may include computer-readable code that may be executable by one or more processors 202 to perform predetermined operations. In an embodiment, the one or more computing devices 108 may present a user interface, received from the application server 104, to the one or more users to display the content related to an augmented reality game on a display screen of the one or more computing devices 108 associated with the one or more users. Examples of the one or more computing devices 108 may include but are not limited to, a personal computer, a laptop, a personal digital assistant (PDA), a mobile device, a tablet, or any other computing device.

Figure 2:
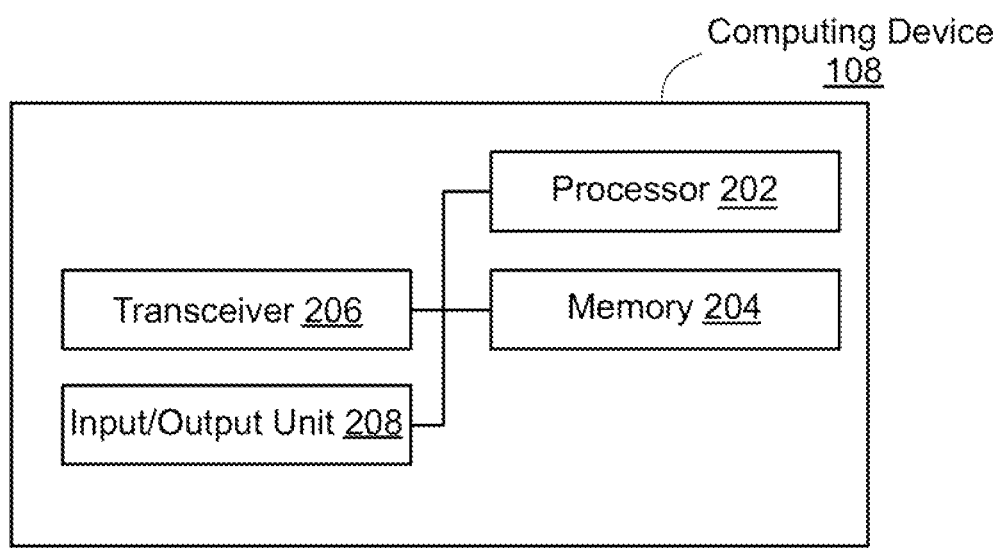
FIG. 2 is a block diagram that illustrates various components of the computing device configured to provide an augmented reality game, in accordance with at least one embodiment.

FIG. 2 is a block diagram that illustrates various components of the computing device configured to provide an augmented reality game, in accordance with at least one embodiment FIG. 2 is explained in conjunction with elements from FIG. 1. In an embodiment, the computing device 108 includes a processor 202, a memory 204, a transceiver 206, and an input/output unit 208. The processor 202 may be communicatively coupled to the memory 204, the transceiver 206, and the input/output unit 208. The transceiver 206 may be communicatively coupled to the communication network 106.

The processor 202 comprises suitable logic, circuitry, interfaces, and/or code that may be configured to execute a set of instructions stored in memory 204. The processor 202 may be implemented based on several processor technologies known in the art. The processor 202 works in coordination with the transceiver 206, and the input/output unit 210 to provide an augmented reality game. Examples of the processor 202 include but are not limited to, an X86-based processor, a Reduced Instruction Set Computing (RISC) processor, an Application-Specific Integrated Circuit (ASIC) processor, a Complex Instruction Set Computing (CISC) processor, and/or other processors.

The memory 204 comprises suitable logic, circuitry, interfaces, and/or code that may be configured to store the set of instructions, which are executed by the processor 202. In an embodiment, the memory 204 may be configured to store one or more programs, routines, or scripts that are executed in coordination with the processor 202. The memory 204 may be implemented based on Random-Access Memory (RAM), a Read-Only Memory (ROM), a Hard Disk Drive (HDD), a storage server, and/or a Secure Digital (SD) card.

The transceiver 206 comprises suitable logic, circuitry, interfaces, and/or code that may be configured to receive the content related to augmented reality game from the database server 102, via the communication network 106. The transceiver 206 may be further configured to transmit the content related to augmented reality game to one or more display screens of the computing devices 108, via the communication network 106. The transceiver 206 may implement one or more known technologies to support wired or wireless communication with the communication network 106. In an embodiment, the transceiver 206 may include, but is not limited to, an antenna, a radio frequency (RF) transceiver, one or more amplifiers, a tuner, one or more oscillators, a digital signal processor, a Universal Serial Bus (USB) device, a coder-decoder (CODEC) chipset, a subscriber identity module (SIM) card, and/or a local buffer. The transceiver 206 may communicate via wireless communication with networks, such as the Internet, an Intranet and/or a wireless network, such as a cellular telephone network, a wireless local area network (LAN), and/or a metropolitan area network (MAN). Wireless communication may use any of a plurality of communication standards, protocols, and technologies, such as Global System for Mobile Communications (GSM), Enhanced Data GSM Environment (EDGE), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for email, instant messaging, and/or Short Message Service (SMS).

The input/output unit 210 comprises suitable logic, circuitry, interfaces, and/or code that may be configured to provide one or more inputs to the application server 104 when the user initiates the augmented reality game on his/her computing device 108. The input/output unit 210 comprises various input and output devices that are configured to communicate with the processor 202. Examples of the input devices include, but are not limited to, a keyboard, a mouse, a joystick, a touch screen, a microphone, a camera, and/or a docking station. Examples of the output devices include, but are not limited to, a display screen and/or a speaker.

In operation, the processor 202 works in coordination with the transceiver 206, and the input/output unit 210 to provide an augmented reality game. The processor 202 is configured to identify a horizontal surface to place an augmented reality arcade machine upon receiving a press gesture on a start button of an application displayed over a display screen of a computing device. In an embodiment, the application is a mobile application based on Android™, iOS™, or Windows™. The processor 202 is configured to allow the user to download the mobile application that may be commercialized as ExtremeSneakList (ESL) or ESL Arcade game. The processor 202 is configured to place the augmented reality arcade machine on a grid. The display screen presents a play button and a reset button on the application after the placement of the augmented reality arcade machine on the grid. In an embodiment, the reset button adjusts the placement of the augmented reality arcade machine.

The processor 202 is configured to transmit a "gameStart" command to the application server 104 upon receiving the press gesture on the play button. The application server 104 utilizes a game token to load a plurality of prize items into a plurality of slots. The slots include a total of nine slots, having three slots on each row available to a user, and the user places a key in one of the nine slots to win the prize item. The processor 202 is configured to facilitate the user to use at least two controls to decide where the user wants to place the key. The processor 202 is configured to determine a probability of winning based on whether the key is placed in the slot or the key is out of the slot. In an embodiment, the processor 202 utilizes a ray-matching algorithm to determine whether the key is in the slot or not. The application server 104 utilizes a threshold algorithm to compute whether the user has won or lost upon receiving a command pertaining to the probability of winning of the user from the processor. The processor 202 is configured to transmit a command to the display screen to display one or more of a win user interface, and a lost user interface based on the computation performed by the application server 104.

The processor 202 is configured to transmit a signal to the display screen to display a pop-up to receive data pertaining to the prize items, credentials of the user, and a shipping address from the user. The processor 202 transmits the data received from the user to the application server. The processor 202 is configured to transmit a signal to the display screen to display an option to the user of playing again after the computation performed by the application server 104.

A person skilled in the art will understand that the scope of the disclosure should not be limited to the providing the augmented reality game based on the aforementioned factors and using the aforementioned techniques. Further, the examples provided in the specification are for illustrative purposes and should not be construed to limit the scope of the disclosure.

In operation, there are a total of nine slots on the ESL Arcade game. The nine slots have different prize items that the users could win. The users can check these prize items in the prizes section before they click on the play button to start the ESL Arcade game. These prizes are chosen by an administrator from the backend and they can change anytime. On pressing the start button, the mobile application starts to look for a horizontal surface to place the augmented reality arcade machine. Once the users see a grid and tap on it to place the machine, the users can see a play button and a reset button. The reset button can be used to adjust the placement if needed. On pressing the play button, a "gameStart" command is sent to the application server and a game token is consumed and all the prize items are loaded into the slots. There are a total of 9 slots, having 3 slots on each row available to the users, and the users can place the key in any of the slots to win a prize item. The users can use the two controls to decide where they want to place the key. If it is in the slot (as calculated by a ray matching algorithm projecting the key onto the slot), the user has a chance at winning the game. If it is out of the slot, the user is shown that they have lost. If there is a chance of winning, the backend is asked to judge using probabilities whether the user has won or lost. There is a threshold value assigned to each slot of a row. For example, the bottom row has a total of three slots i.e. total threshold value of 70. Whenever a user tries to put a key inside a slot, one threshold value is used. Same way, if 50 users try to put a key in the same slot or any slot inside a row total of 50 thresholds is used. If a key fits inside a slot, it sends a command to the server for checking the winning probability. The application server checks this winning probability only for one user at a time, if two users send this command at the same time, one of them is kept waiting until the other user's probability is being checked.

According to an embodiment herein, the probability of winning for a user is based on a threshold algorithm. If a threshold value filled is less than 80% then the user has a winning chance of 1 out of 10 million. If the threshold value is 80% then the user has a 50% probability of winning. If the threshold value is >80% and <90% then the user has a winning probability between 50-90%. If the threshold value is 90% then the user has a 90% probability of winning. If the threshold value is 100% then the user has a 100% probability of winning. After the threshold value is 100% filled, it resets the threshold value for that row to 0 and all probability calculation starts again for that row.

If the backend returns success based on the probability in step 6, the user is shown that they have won. Otherwise, the user is shown that they have lost. If the user wins, details like shoe size, address, etc. are collected through a pop-up which is then submitted to the backend so the won item can be shipped to the user. Finally, in both win/lose scenarios, the user is presented with an option to play again if they want.

Figure 3:
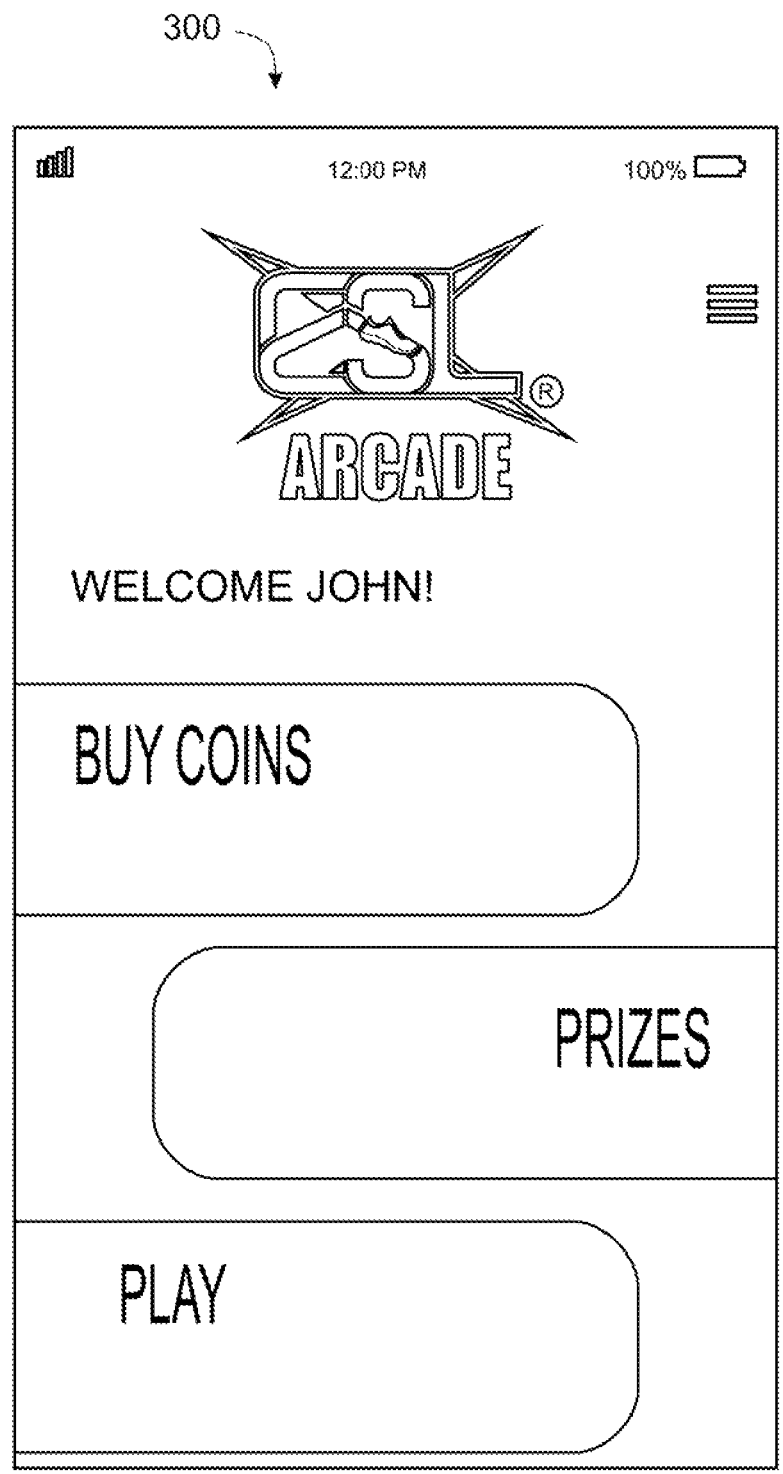
FIG. 3 illustrates a screenshot of a game home screen, in accordance with at least one embodiment.
Figure 4:
FIG. 4 illustrates a screenshot of a welcome screen, in accordance with at least one embodiment.
Figure 5:
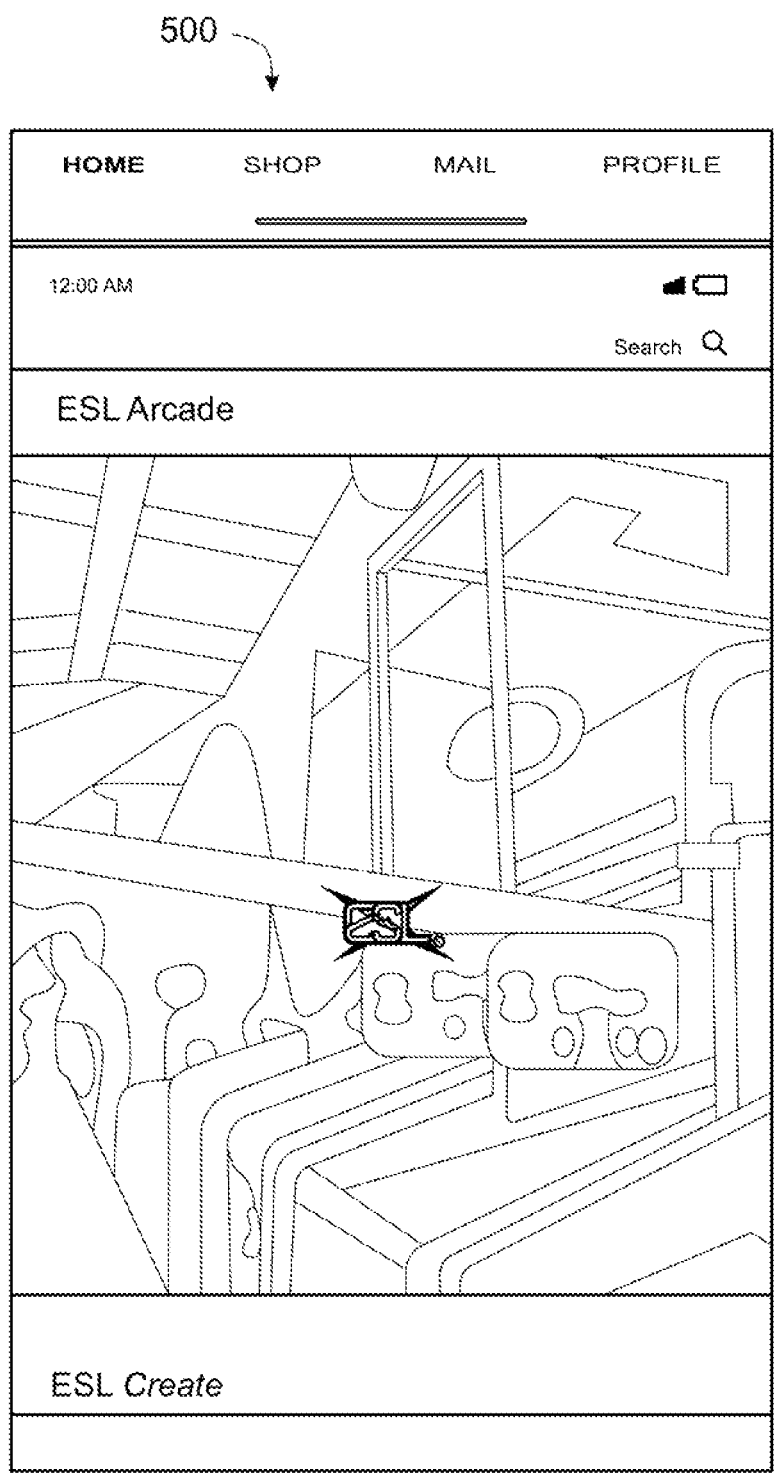
FIG. 5 illustrates a screenshot of the ESL arcade screen, in accordance with at least one embodiment.
Figure 6:
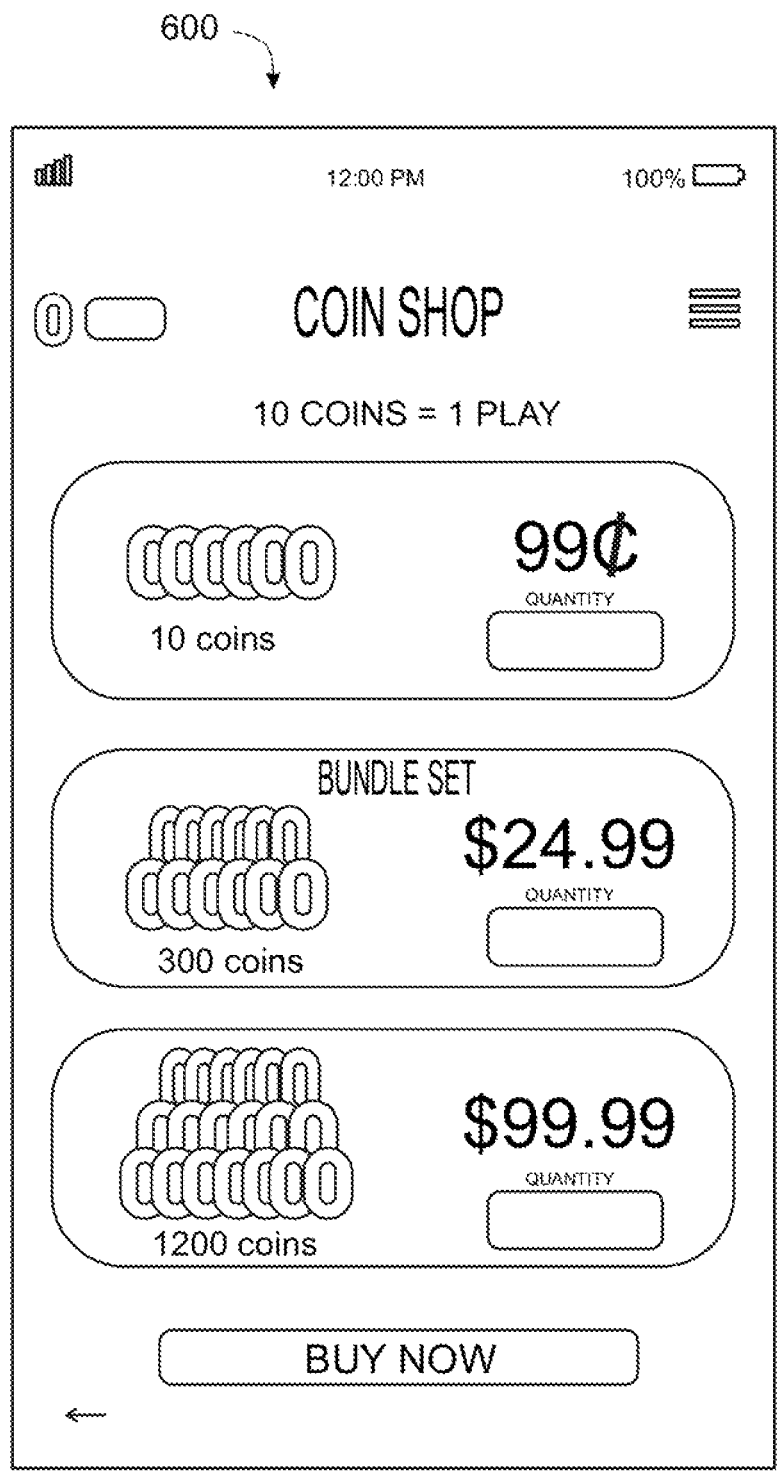
FIG. 6 illustrates a screenshot of a coin shop, in accordance with at least one embodiment.
Figure 7:
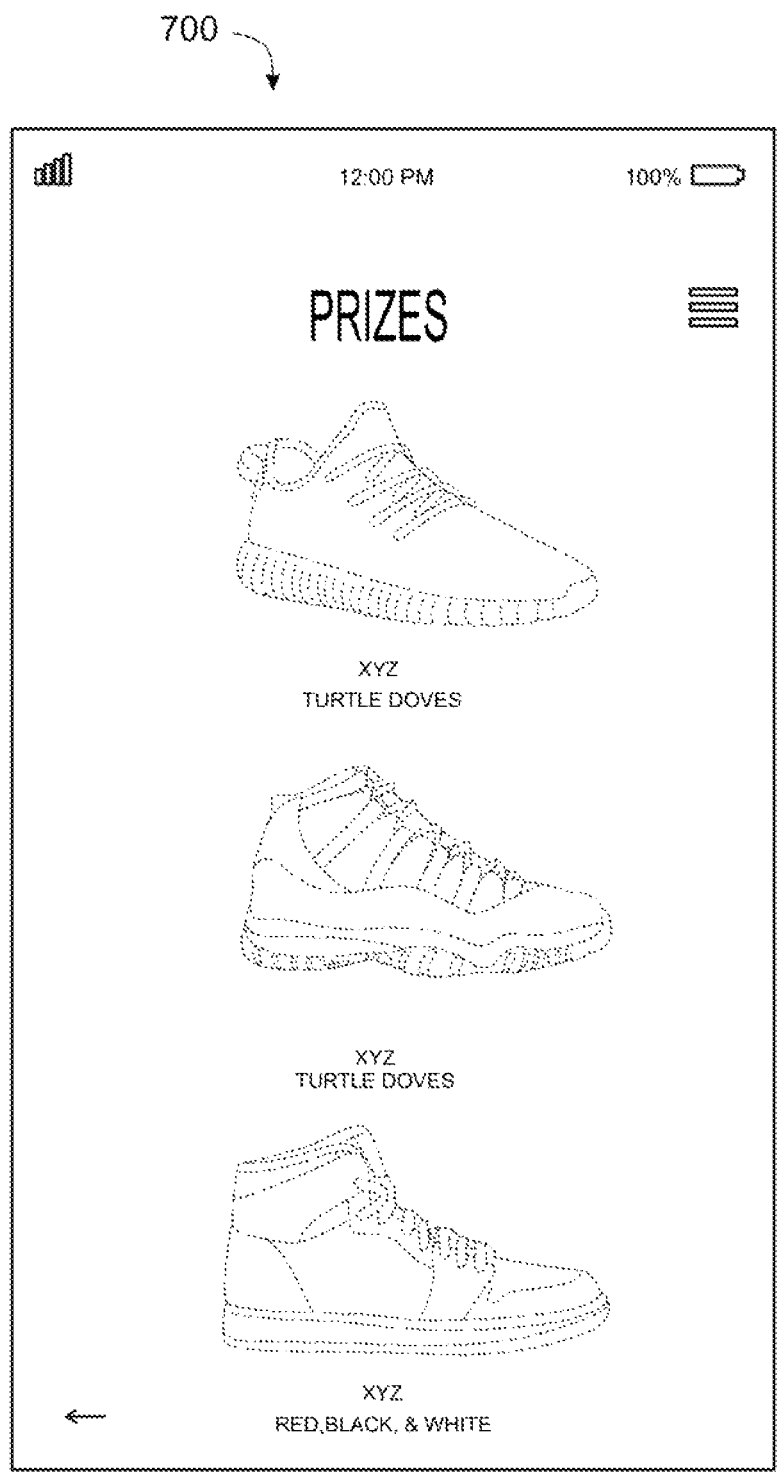
FIG. 7 illustrates a screenshot of the prizes listing screen, in accordance with at least one embodiment.
Figure 8:
FIG. 8 illustrates a screenshot of the ESL logo, in accordance with at least one embodiment.
Figure 9:
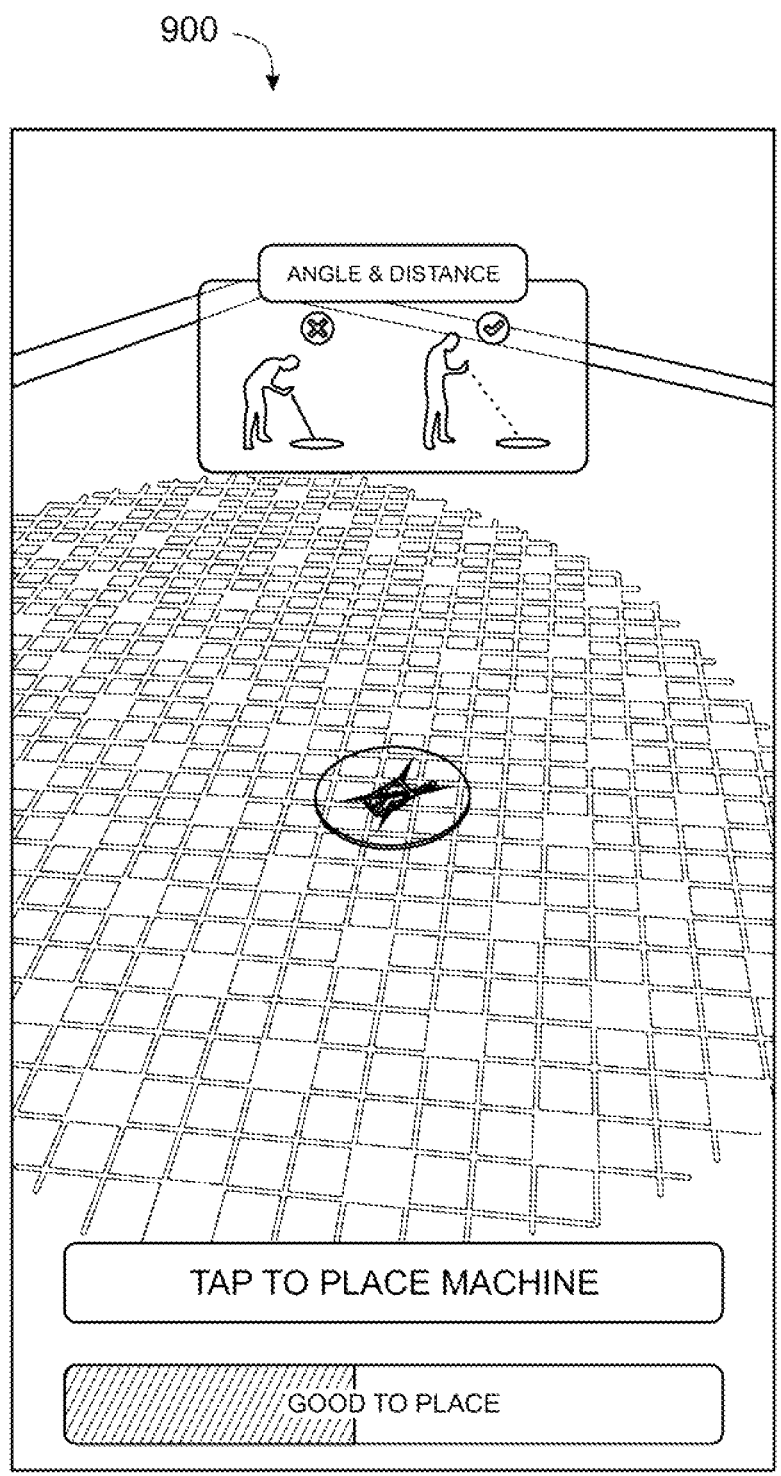
FIG. 9 illustrates a screenshot of placing a virtual 3D game vending machine structure on a flat textured surface, in accordance with at least one embodiment.
Figure 10:
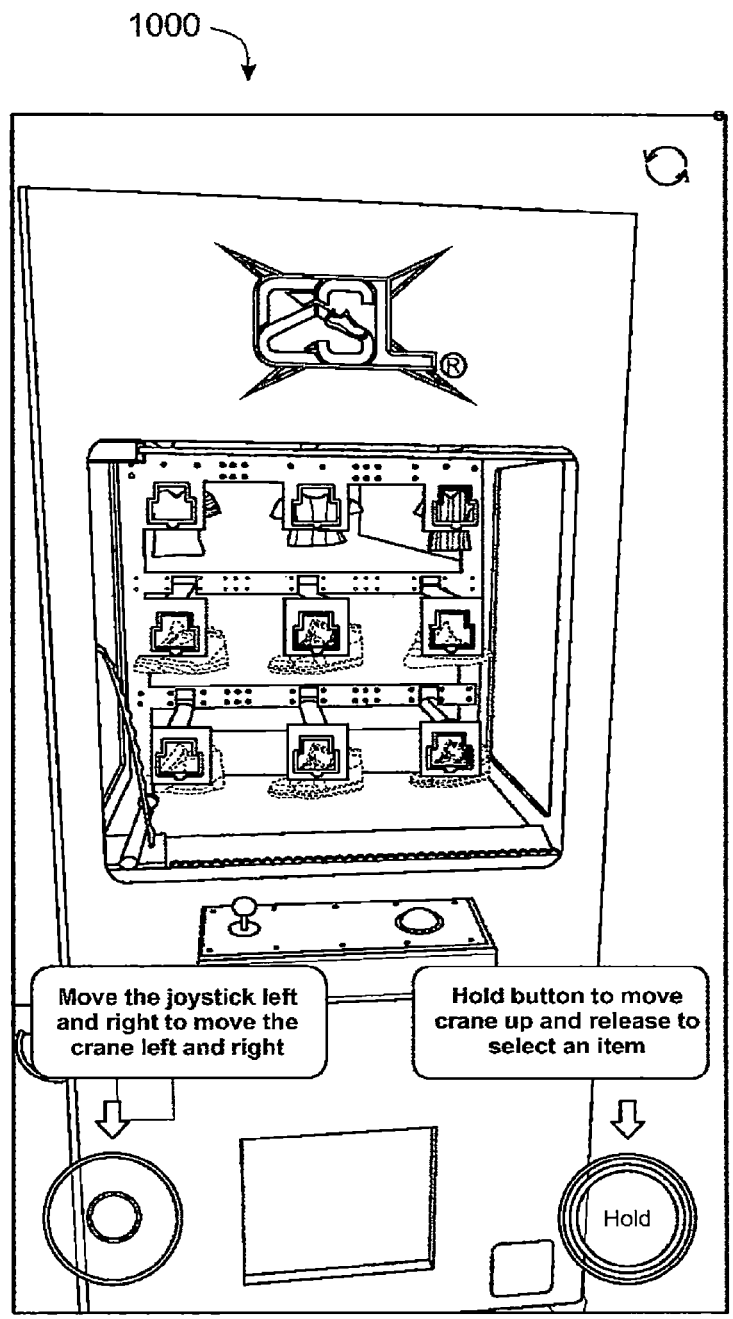
FIG. 10 illustrates a screenshot of the hold button to move the crane, in accordance with at least one embodiment.
Figure 11:
FIG. 11 illustrates a screenshot of a winning screen, in accordance with at least one embodiment.

FIG. 3 illustrates screenshot 300 of a game home screen, in accordance with at least one embodiment. FIG. 3 is explained in conjunction with elements from FIGS. 1-2. The processor 202 is configured to facilitate the user to sign up or log in to the mobile application. FIG. 4 illustrates a screenshot 400 of a welcome screen, in accordance with at least one embodiment. FIG. 4 is explained in conjunction with elements from FIGS. 1-2. FIG. 5 illustrates a screenshot 500 of the ESL arcade screen, in accordance with at least one embodiment. FIG. 5 is explained in conjunction with elements from FIGS. 1-2. The processor 202 is then configured to allow the user to click an ESL arcade tab present on the main menu of the mobile application to enter the ESL arcade game portal. Then a game home screen will appear on a display screen of the computing device. FIG. 6 illustrates a screenshot 600 of a coin shop, in accordance with at least one embodiment. FIG. 6 is explained in conjunction with elements from FIGS. 1-2. The display screen will present various buttons to click and buy the coins (from a coin shop interface). The processor 202 is configured to facilitate the user to buy the coins to play prizes. FIG. 7 illustrates a screenshot 700 of the prizes listing screen, in accordance with at least one embodiment. FIG. 7 is explained in conjunction with elements from FIGS. 1-2. A listing of the available prizes will be presented over the play portal to play the game. FIG. 8 illustrates a screenshot 800 of the ESL logo, in accordance with at least one embodiment. FIG. 8 is explained in conjunction with elements from FIGS. 1-2. The ESL logo appears on the display screen and the user can tap on the ESL logo to start. FIG. 9 illustrates screenshot 900 of placing a virtual 3D game vending machine structure on a flat textured surface, in accordance with at least one embodiment. FIG. 9 is explained in conjunction with elements from FIGS. 1-2. The processor 202 is configured to facilitate the user to place a virtual 3D game vending machine structure on a flat textured surface. The user then taps the display screen for the 3D game vending machine structure to appear. The processor 202 is configured to allow the user to use coins bought from the coin shop to play the game. The user must use the joystick to move the left and right to move the crane left and right. FIG. 10 illustrates a screenshot 1000 of the hold button to move the crane, in accordance with at least one embodiment. FIG. 10 is explained in conjunction with elements from FIGS. 1-2. The user must use the hold button to move the crane up and release it to select a slot. The user must get a key inside 1 of the 9 slots to win. If the key doesn't fit in the slot the user will lose and a screen will pop up saying "So close try again". After the appearance of a losing screen, the user can replay the game by purchasing more coins. If the user gets the key inside 1 of the 9 slots, the user will win the prize behind the slot the key entered. Lastly, a winning screen will pop up with a picture of the prize item. FIG. 11 illustrates a screenshot 1100 of a winning screen, in accordance with at least one embodiment. FIG. 11 is explained in conjunction with elements from FIGS. 1-2. The winning user will have to enter their name, size, and address to receive the winning item. After the appearance of the win screen, the user can replay the game or go back to the ESL arcade main menu.

The present system can be utilized as a software application or web application. The present system may be integrated with a social media platform and may not require a prior installation on the computing device. The present system uses 3D modeling, and animation to provide an augmented reality experience through the mobile application that gives a real-world game feeling in a virtual environment. The present system turns a physical vending machine game into an augmented reality game. Which brings the opportunity to play anywhere with an Augmented Reality-supported mobile device. The present system uses an augmented reality-supported device to play this game.

Figure 12:
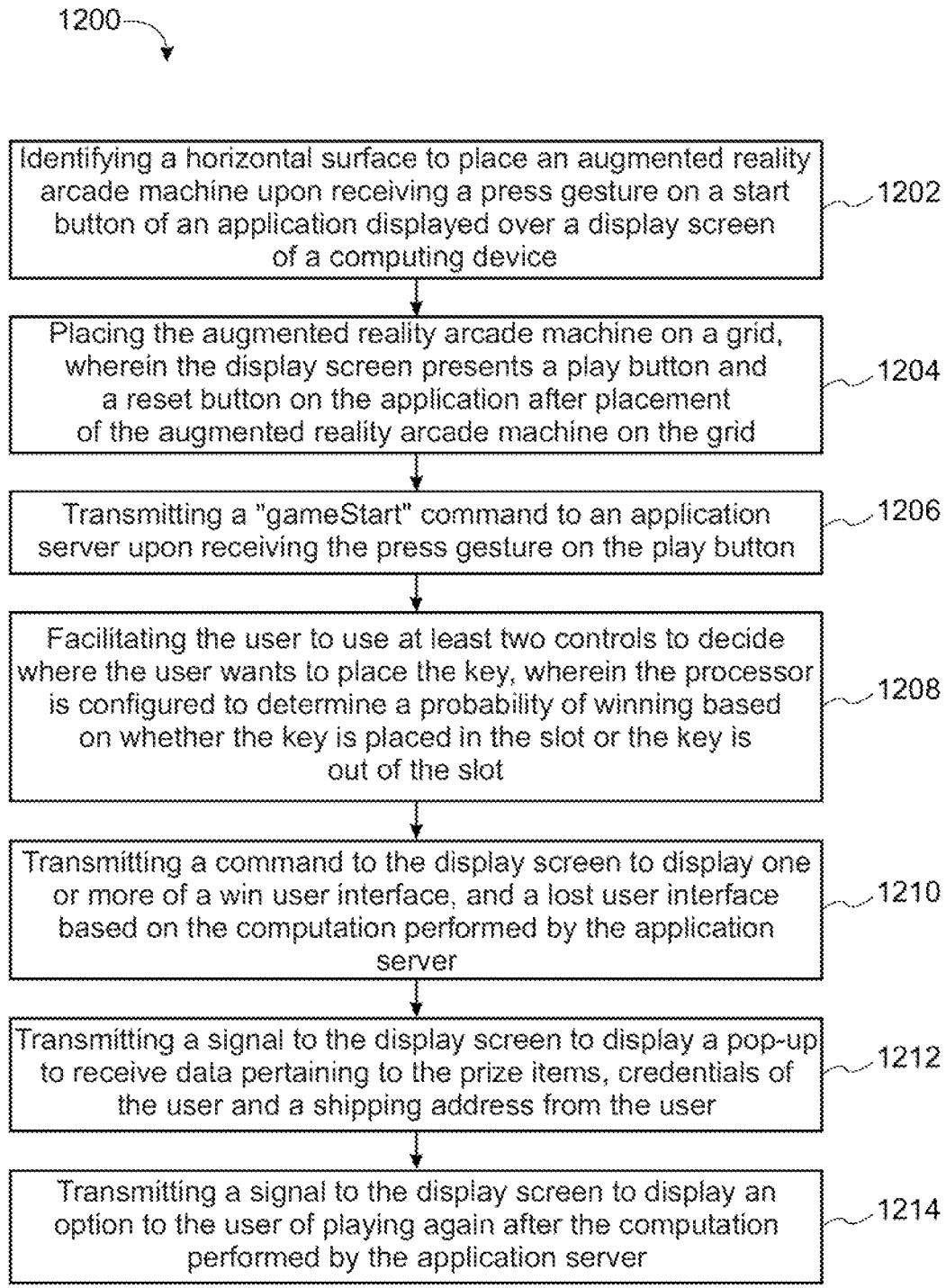
FIG. 12 is a flowchart that illustrates a method for providing an augmented reality game, in accordance with at least one embodiment.

FIG. 12 is a flowchart 1200 that illustrates a method for providing an augmented reality game, in accordance with at least one embodiment. The flowchart 1200 is described in conjunction with FIG. 1 and FIG. 2. The method includes a step 1202 of identifying a horizontal surface to place an augmented reality arcade machine upon receiving a press gesture on a start button of an application displayed over a display screen of a computing device. The method includes a step 1204 of placing the augmented reality arcade machine on a grid. The display screen presents a play button and a reset button on the application after placement of the augmented reality arcade machine on the grid. In an embodiment, the reset button adjusts the placement of the augmented reality arcade machine.

The method includes a step 1206 of transmitting a "gameStart" command to an application server upon receiving the press gesture on the play button. The application server utilizes a game token to load a plurality of prize items into a plurality of slots. The slots include a total of nine slots, having three slots on each row available to a user, and the user places a key in one of the nine slots to win the prize item. The method includes a step 1208 of facilitating the user to use at least two controls to decide where the user wants to place the key. The processor is configured to determine a probability of winning based on whether the key is placed in the slot or the key is out of the slot. In an embodiment, the processor utilizes a ray-matching algorithm to determine whether the key is in the slot or not.

The application server utilizes a threshold algorithm to compute whether the user has won or lost upon receiving a command pertaining to the probability of winning of the user from the processor. The method includes a step 1210 of transmitting a command to the display screen to display one or more of a win user interface, and a lost user interface based on the computation performed by the application server. The method includes a step 1212 of transmitting a signal to the display screen to display a pop-up to receive data pertaining to the prize items, credentials of the user and a shipping address from the user, wherein the processor transmits the data received from the user to the application server. The method includes a step 1214 of transmitting a signal to the display screen to display an option to the user of playing again after the computation performed by the application server.

The present disclosure may be realized in hardware or a combination of hardware and software. The present disclosure may be realized in a centralized fashion, in at least one computer system, or in a distributed fashion, where different elements may be spread across several interconnected computer systems. A computer system or other apparatus adapted for carrying out the methods described herein may be suited. A combination of hardware and software may be a general-purpose computer system with a computer program that, when loaded and executed, may control the computer system such that it carries out the methods described herein. The present disclosure may be realized in hardware that comprises a portion of an integrated circuit that also performs other functions.

A person with ordinary skills in the art will appreciate that the systems, modules, and sub-modules have been illustrated and explained to serve as examples and should not be considered limiting in any manner. It will be further appreciated that the variants of the above-disclosed system elements, modules, and other features and functions, or alternatives thereof, may be combined to create other different systems or applications.

Those skilled in the art will appreciate that any of the aforementioned steps and/or system modules may be suitably replaced, reordered, or removed, and additional steps and/or system modules may be inserted, depending on the needs of a particular application. In addition, the systems of the aforementioned embodiments may be implemented using a wide variety of suitable processes and system modules, and are not limited to any particular computer hardware, software, middleware, firmware, microcode, and the like. The claims can encompass embodiments for hardware and software, or a combination thereof.

While the present disclosure has been described with reference to certain embodiments, it will be understood by those skilled in the art that various changes may be made and equivalents may be substituted without departing from the scope of the present disclosure. In addition, many modifications may be made to adapt a particular situation or material to the teachings of the present disclosure without departing from its scope. Therefore, it is intended that the present disclosure not be limited to the particular embodiment disclosed, but that the present disclosure will include all embodiments falling within the scope of the appended claims.

What is claimed is:

1. A gaming system, comprising:
   at least one processor; and
   at least one memory which stores a plurality of instructions, which when executed by the at least one processor, cause the at least one processor to:
   identify a horizontal surface to place an augmented reality arcade machine upon receiving a press gesture on a start button of an application displayed over a display screen of a computing device;
   place the augmented reality arcade machine on a grid, wherein the display screen presents a play button and a reset button on the application after placement of the augmented reality arcade machine on the grid;
   transmit a "gameStart" command to an application server upon receiving the press gesture on the play button, wherein the application server utilizes a game token to load a plurality of prize items into a plurality of slots, wherein the plurality of slots comprising a total of nine slots, having three slots on each row available to a user, and the user places a key in one of the nine slots to win the prize items;
   facilitate the user to use at least two controls to decide where the user wants to place the key, wherein the processor is configured to determine a probability of winning based on whether the key is placed in the slot or the key is out of the slot, wherein the application server utilizes a threshold algorithm to compute whether the user has won or lost upon receiving a command pertaining to the probability of winning of the user from the processor; and transmit a command to the display screen to display one or more of a win user interface, and a lost user interface based on the computation performed by the application server, wherein the reset button adjusts the placement of the augmented reality arcade machine.

2. The gaming system of claim 1, wherein when executed by the at least one processor, the plurality of instructions cause the at least one processor to: transmit a signal to the display screen to display a pop-up to receive data pertaining to the prize items, credentials of the user and a shipping address from the user, wherein the processor transmits the data received from the user to the application server.

3. The gaming system of claim 1, wherein when executed by the at least one processor, the plurality of instructions cause the at least one processor to: transmit a signal to the display screen to display an option to the user of playing again after the computation performed by the application server.

4. The gaming system of claim 1, wherein the processor utilizes a ray-matching algorithm to determine whether the key is in the slot or not.

5. A method of operating a gaming system, said method comprising:

identifying, by a processor, a horizontal surface to place an augmented reality arcade machine upon receiving a press gesture on a start button of an application displayed over a display screen of a computing device;

placing, by the processor, the augmented reality arcade machine on a grid, wherein the display screen presents a play button and a reset button on the application after placement of the augmented reality arcade machine on the grid;

transmitting, by the processor, a "gameStart" command to an application server upon receiving the press gesture on the play button, wherein the application server utilizes a game token to load a plurality of prize items into a plurality of slots, wherein the plurality of slots comprising a total of nine slots, having three slots on each row available to a user, and the user places a key in one of the nine slots to win the prize items;

facilitating, by the processor, the user to use at least two controls to decide where the user wants to place the key, wherein the processor is configured to determine a probability of winning based on whether the key is placed in the slot or the key is out of the slot, wherein the application server utilizes a threshold algorithm to compute whether the user has won or lost upon receiving a command pertaining to the probability of winning of the user from the processor; and transmitting, by the processor, a command to the display screen to display one or more of a win user interface, and a lost user interface based on the computation performed by the application server, wherein the reset button adjusts the placement of the augmented reality arcade machine.

6. The method of claim 5, further comprising transmitting, by the processor, a signal to the display screen to display a pop-up to receive data pertaining to the prize items, credentials of the user and a shipping address from the user, wherein the processor transmits the data received from the user to the application server.

7. The method of claim 5, further comprising transmitting, by the processor, a signal to the display screen to display an option to the user of playing again after the computation performed by the application server.

8. The method of claim 5, wherein the processor utilizes a ray-matching algorithm to determine whether the key is in the slot or not.

* * * * *